US006983174B2

(12) United States Patent
Hoppenstein et al.

(10) Patent No.: US 6,983,174 B2
(45) Date of Patent: Jan. 3, 2006

(54) DISTRIBUTED ACTIVE TRANSMIT AND/OR RECEIVE ANTENNA

(75) Inventors: Russell Hoppenstein, Richardson, TX (US); Mike Thomas, Richardson, TX (US); Mano D. Judd, Rockwall, TX (US)

(73) Assignee: Andrew Corporation, Orland Park, IL (US)

( * ) Notice: Subject to any disclaimer, the term of this patent is extended or adjusted under 35 U.S.C. 154(b) by 371 days.

(21) Appl. No.: 10/246,178
(22) Filed: Sep. 18, 2002

(65) Prior Publication Data

US 2004/0192392 A1 Sep. 30, 2004

(51) Int. Cl.
*H04B 1/38* (2006.01)
(52) U.S. Cl. .................... 455/562.1; 455/129; 455/269
(58) Field of Classification Search ............. 455/562.1, 455/83, 84, 129, 269, 272, 273
See application file for complete search history.

(56) References Cited

U.S. PATENT DOCUMENTS

| | | | | |
|---|---|---|---|---|
| 4,070,637 | A | 1/1978 | Assal et al. | 333/7 |
| 4,124,852 | A | 11/1978 | Steudel | 343/854 |
| 4,246,585 | A | 1/1981 | Mailloux | 343/854 |
| 4,360,813 | A | 11/1982 | Fitzsimmons | 343/100 R |
| 4,566,013 | A | 1/1986 | Steinberg et al. | 343/372 |
| 4,607,389 | A | 8/1986 | Halgrimson | 455/11 |
| 4,614,947 | A | 9/1986 | Rammos | 343/778 |
| 4,689,631 | A | 8/1987 | Gans et al. | 343/781 R |
| 4,825,172 | A | 4/1989 | Thompson | 330/124 R |
| 4,849,763 | A | 7/1989 | DuFort | 342/372 |
| 4,890,110 | A | 12/1989 | Kuwahara | 342/35 |
| 4,994,813 | A | 2/1991 | Shiramatsu et al. | 342/360 |
| 5,034,752 | A | 7/1991 | Pourailly et al. | 342/373 |
| 5,038,150 | A | 8/1991 | Bains | 342/373 |
| 5,061,939 | A | 10/1991 | Nakase | 343/700 MS |
| 5,206,604 | A | 4/1993 | Vaninetti | 330/124 R |
| 5,230,080 | A | 7/1993 | Fabre et al. | 455/15 |
| 5,247,310 | A | 9/1993 | Waters | 342/368 |
| 5,248,980 | A | 9/1993 | Raguenet | 342/354 |
| 5,270,721 | A | 12/1993 | Tsukamoto et al. | 343/700 MS |
| 5,280,297 | A | 1/1994 | Profera, Jr. | 343/754 |
| 5,327,150 | A | 7/1994 | Cherrette | 343/771 |
| 5,355,143 | A | 10/1994 | Zurcher et al. | 343/700 MS |
| RE34,796 | E | 11/1994 | Smith et al. | 343/876 |
| 5,379,455 | A | 1/1995 | Koschek | 455/273 |
| 5,412,414 | A | 5/1995 | Ast et al. | 342/174 |
| 5,437,052 | A | 7/1995 | Hemmie et al. | 455/5.1 |
| 6,519,478 | B1 | 2/2003 | Scherzer et al. | 455/562 |
| 6,567,647 | B1 * | 5/2003 | Epperson | 455/83 |

(Continued)

FOREIGN PATENT DOCUMENTS

| | | |
|---|---|---|
| CA | 2306650 | 10/2000 |
| EP | 0 245 955 A2 | 11/1987 |
| EP | 0 447 218 B1 | 9/1991 |

(Continued)

OTHER PUBLICATIONS

Howat, F., "Cell Like Performace Using the Remotely Controlled Cellular Transmitter", *Gateway to New Concepts in Vehicular Technology*, San Francisco, CA, May 1-3, 1989, Vehicular Technology Conference, 39th IEEE, vol. 2, pp. 535-541, XP000076080.

(Continued)

*Primary Examiner*—Joseph Feild
*Assistant Examiner*—Marisol Figueroa
(74) *Attorney, Agent, or Firm*—Wood, Herron & Evans, L.L.P.

(57) ABSTRACT

A distributed antenna system comprising a plurality of antenna elements, duplexers and amplifiers, each amplifier and duplexer operatively coupled with one of said antenna elements and mounted closely adjacent to the associated antenna element in such a manner as incidences of insertion loss, noise and system failure are reduced.

25 Claims, 5 Drawing Sheets

U.S. PATENT DOCUMENTS

| | | | | |
|---|---|---|---|---|
| 5,457,557 A | | 10/1995 | Zarem et al. | 359/121 |
| 5,513,176 A | | 4/1996 | Dean et al. | 370/18 |
| 5,548,813 A | | 8/1996 | Charas et al. | 455/33.3 |
| 5,554,865 A | | 9/1996 | Larson | 257/275 |
| 5,568,160 A | | 10/1996 | Collins | 343/778 |
| 5,596,329 A | | 1/1997 | Searle et al. | 342/374 |
| 5,604,462 A | | 2/1997 | Gans et al. | 330/124 R |
| 5,604,925 A | | 2/1997 | O'Malley et al. | 455/254 |
| 5,610,510 A | | 3/1997 | Boone et al. | 324/95 |
| 5,619,210 A | | 4/1997 | Dent | 342/352 |
| 5,623,269 A | | 4/1997 | Hirshfield et al. | 342/354 |
| 5,644,316 A | | 7/1997 | Lewis et al. | 342/174 |
| 5,644,622 A | | 7/1997 | Russell et al. | 455/422 |
| 5,646,631 A | | 7/1997 | Arntz | 342/373 |
| 5,657,374 A | | 8/1997 | Russell et al. | 370/328 |
| 5,659,322 A | | 8/1997 | Caille | 342/188 |
| 5,680,142 A | | 10/1997 | Smith et al. | 342/372 |
| 5,710,804 A | | 1/1998 | Bhame et al. | 379/58 |
| 5,714,957 A | | 2/1998 | Searle et al. | 342/374 |
| 5,724,666 A | | 3/1998 | Dent | 455/562 |
| 5,745,841 A | | 4/1998 | Reudink et al. | 455/62 |
| 5,751,250 A | | 5/1998 | Arntz | 342/373 |
| 5,754,139 A | | 5/1998 | Turcotte et al. | 342/373 |
| 5,758,287 A | | 5/1998 | Lee et al. | 455/450 |
| 5,770,970 A | | 6/1998 | Ikeda et al. | 330/286 |
| 5,771,017 A | | 6/1998 | Dean et al. | 342/374 |
| 5,774,666 A | | 6/1998 | Portuesi | 395/200.48 |
| 5,784,031 A | | 7/1998 | Weiss et al. | 342/373 |
| 5,790,078 A | | 8/1998 | Suzuki et al. | 343/700 |
| 5,802,173 A | | 9/1998 | Hamilton-Piercy et al. | 379/56.2 |
| 5,809,395 A | | 9/1998 | Hamilton-Piercy et al. | 455/4.1 |
| 5,815,115 A | | 9/1998 | Carloni et al. | 342/359 |
| 5,825,762 A | | 10/1998 | Kamin, Jr. et al. | 370/335 |
| 5,832,389 A | | 11/1998 | Dent | 455/562 |
| 5,835,128 A | | 11/1998 | Macdonald et al. | 348/8 |
| 5,854,611 A | | 12/1998 | Gans et al. | 342/373 |
| 5,856,804 A | | 1/1999 | Turcotte et al. | 342/371 |
| 5,862,459 A | | 1/1999 | Charas | 455/114 |
| 5,872,547 A | | 2/1999 | Martek | 343/815 |
| 5,878,345 A | | 3/1999 | Ray et al. | 455/431 |
| 5,880,701 A | | 3/1999 | Bhame et al. | 343/890 |
| 5,884,147 A | | 3/1999 | Reudink et al. | 455/67.1 |
| 5,889,494 A | | 3/1999 | Reudink et al. | 342/373 |
| 5,896,104 A | | 4/1999 | Komatsu et al. | 342/175 |
| 5,923,296 A | | 7/1999 | Sanzgirl et al. | 343/700 |
| 5,929,823 A | | 7/1999 | Martek et al. | 343/817 |
| 5,933,113 A | | 8/1999 | Newberg et al. | 342/375 |
| 5,936,577 A | | 8/1999 | Shoki et al. | 342/373 |
| 5,936,591 A | | 8/1999 | Yamasa et al. | 343/853 |
| 5,940,045 A | | 8/1999 | Belcher et al. | 343/850 |
| 5,949,376 A | | 9/1999 | McDonald et al. | 343/700 MS |
| 5,966,094 A | | 10/1999 | Ward et al. | 342/373 |
| 5,969,689 A | | 10/1999 | Martek et al. | 343/758 |
| 5,987,335 A | | 11/1999 | Knoedl, Jr. et al. | 455/561 |
| 6,008,763 A | | 12/1999 | Nystrom et al. | 343/700 MS |
| 6,016,123 A | | 1/2000 | Barton et al. | 342/373 |
| 6,018,643 A | | 1/2000 | Golemon et al. | 455/63 |
| 6,020,848 A | | 2/2000 | Wallace et al. | 342/362 |
| 6,037,903 A | | 3/2000 | Lange et al. | 343/700 MS |
| 6,043,790 A | | 3/2000 | Derneryd et al. | 343/853 |
| 6,047,199 A | | 4/2000 | DeMarco | 455/572 |
| 6,055,230 A | | 4/2000 | Feuerstein et al. | 370/335 |
| 6,070,090 A | | 5/2000 | Feuerstein | 455/561 |
| 6,072,434 A | | 6/2000 | Papatheodorou | 343/700 MS |
| 6,091,360 A | | 7/2000 | Reits | 342/368 |
| 6,091,970 A | * | 7/2000 | Dean | 455/562.1 |
| 6,094,165 A | | 7/2000 | Smith | 342/373 |
| 6,104,935 A | | 8/2000 | Smith et al. | 455/562 |
| 6,140,976 A | | 10/2000 | Locke et al. | 343/853 |
| 6,144,652 A | | 11/2000 | Avidor et al. | 370/336 |
| 6,157,343 A | | 12/2000 | Andersson et al. | 342/371 |
| 6,160,514 A | | 12/2000 | Judd | 343/700 MS |
| 6,181,276 B1 | | 1/2001 | Schlekewey et al. | 342/372 |
| 6,188,373 B1 | | 2/2001 | Martek | 343/893 |
| 6,195,556 B1 | | 2/2001 | Reudink et al. | 455/456 |
| 6,198,434 B1 | | 3/2001 | Martek et al. | 342/373 |
| 6,198,435 B1 | | 3/2001 | Reudink et al. | 342/373 |
| 6,198,460 B1 | | 3/2001 | Brankovic | 343/879 |
| 6,222,503 B1 | | 4/2001 | Gietema et al. | 343/890 |
| 6,233,434 B1 | | 5/2001 | Takei | 455/103 |
| 6,233,466 B1 | | 5/2001 | Wong et al. | 455/562 |
| 6,236,849 B1 | | 5/2001 | Reudink et al. | 455/342 |
| 6,240,274 B1 | | 5/2001 | Izadpanah | 455/39 |
| 6,246,674 B1 | | 6/2001 | Feuerstein et al. | 370/334 |
| 6,266,545 B1 | | 7/2001 | Backman et al. | 455/572 |
| 6,269,255 B1 | | 7/2001 | Waylett | 455/562 |
| 6,377,558 B1 | | 4/2002 | Dent | 370/321 |

FOREIGN PATENT DOCUMENTS

| | | |
|---|---|---|
| EP | 0 551 556 A1 | 7/1993 |
| EP | 0 639 035 A1 | 2/1995 |
| EP | 0 713 261 A1 | 5/1996 |
| EP | 0 878 974 A1 | 11/1998 |
| EP | 0 984 554 A2 | 3/2000 |
| EP | 0 994 567 A2 | 4/2000 |
| EP | 1 111 821 A2 | 6/2001 |
| GB | 2 286 749 A | 8/1995 |
| JP | 08-102618 | 4/1996 |
| JP | 11-330838 | 11/1999 |
| WO | WO 95/26116 | 9/1995 |
| WO | WO 95/34102 | 12/1995 |
| WO | WO 97/44914 | 11/1997 |
| WO | WO 98/11626 | 3/1998 |
| WO | WO 98/09372 | 1/1999 |
| WO | WO 99/26317 | 5/1999 |
| WO | WO 00/31824 | 6/2000 |
| WO | WO 00/39943 | 7/2000 |
| WO | WO 98/50981 | 4/2001 |

OTHER PUBLICATIONS

Shibutani, Makoto et al., "Optical Fiber Feeder for Microcellular Mobile Communication Systems (H-015)", *IEEE Journal on Selected Areas in Communications*, IEEE Inc., New York, NY, vol. 11, No. 7, Sep. 1993, pp. 1118-1126, XP000400021, ISSN: 0733-8716.

Song, H.J. and Bialkowski, M.E.,*A Multilayer Microstrip Patch Antenna Subarray Design Using CAD*, Microwave Journal, Mar. 1997, pp. 22-34 (8 pages).

Levine, E., Malamud, G., Shtrikman, S., and Treves, D., *A Study Microstrip Array Antennas with the Feed Network*, IEEE Trans. Antennas Propagation, vol. 37, No. 4, Apr. 1989, pp. 426-434 (8 pages).

Herd, J.S., *Modelling of Wideband Proximity Coupled Microstrip Array Elements*, Electronic Letters, vol. 2, No. 16, Aug. 1990, pp. 1282-1284 (3 pages).

Hall, P.S., and Hall, C.M., *Coplanar Corporate Feed Effects in Microstrip Patch Array Design*, Proc. IEEE, vol. 135, pt. H, Jun. 1988, p. 180-186 (7 pages).

Zurcher, J.F., *The SSFIP: A Global Concept for High-Performance Broadband Planar Antennas*, Electronic Letters, vol. 24, No. 23, Nov. 1988, p. 1433-1435 (4 pages).

Zurcher, J.F. and Gardiol, F.E., *The SSFIP Principle: Broadband Patch Antennas*, Artech House, 1995, Chapter 3, pp. 45-60 (17 pages).

Song, H.J. and Bialkowski, M.E., *Ku-Band 16 × 16 Planar Array with Aperture-Coupled Microstrip-Patch Elements*, IEEE Antennas and Propagation Magazine, vol. 40, No. 5, Oct. 1998, pp. 25-29 (5 pages).

* cited by examiner

DISTRIBUTED ACTIVE TRANSMIT AND/OR RECEIVE ANTENNA

FIELD OF THE INVENTION

This invention is directed generally to active antennas, and more particularly, to transmit and receive array antennas, such as those used in connection with cellular radio applications.

BACKGROUND OF THE INVENTION

Numerous communications applications, such as cellular and personal communications services (PCS), as well as multi-channel multi-point distribution systems (MMDS) and local multi-point distribution systems (LMDS), conventionally receive and retransmit signals from subscribers utilizing antennas mounted at the tops of towers or other structures. Other communications systems such as wireless local loop (WLL), specialized mobile radio (SMR), and wireless local area network (WLAN), have signal transmission infrastructure for receiving and transmitting communications between system subscribers that similarly utilize various forms of antennas and transceivers.

All of these communications systems require amplification of the signals being transmitted by the antennas. For this purpose, it has heretofore been the practice to use a conventional linear power amplifier system placed at the bottom of the tower or other structure upon which the antennas are mounted. From the base of the tower, the conventional linear power amplifier system typically couples to the antenna elements mounted on the tower with coaxial cables. Coaxial cables, however, introduce power losses that are proportional to length. To overcome these power losses, substantial amplification is typically required, which necessitates the use of more expensive, higher power amplifiers.

Moreover, the diameter of the cables must generally be of a low loss variety to mitigate insertion losses. In addition to increasing system material costs, the low loss cables characteristically have large diameter cross-sections. Thus, along with the relatively long length of cable required by the system configuration, the large diameter of the cables can contribute towards making a system vulnerable to damage sustained from high wind conditions. That is, the dimensions of the cables increase the wind friction experienced by the system.

The size and number of coaxial cables further require reinforcement of the tower structure to accommodate loading forces associated with the weight of the cables. System architects may consequently implement costly preventative design features and expect periodic cable disconnections and other repairs.

As discussed herein, insertion losses associated with the cables may necessitate some increases in the power amplification. A ground level infrastructure or base station typically provides the compensatory amplification, thus further increasing the expense per unit or cost per watt. Of note, output power levels for infrastructure (base station) applications in many of the foregoing communications systems are typically in excess of ten watts, and often up to hundreds of watts, which results in a relatively high effective isotropic power requirement (EIPR).

For example, for a typical base station with a twenty-watt power output (at ground level), the power delivered to the antenna, minus cable losses, is around ten watts. In this case, half of the power has been consumed in cable loss/heat. Such systems require complex linear amplifier components cascaded into high power circuits to achieve the required linearity at the higher output power. Typically, for such high power systems or amplifiers, additional high power dividers must be employed. Operating characteristics of such divider equipment may introduce further insertion losses associated with the equipment, itself.

Some of such losses are addressed in certain instances by positioning amplification equipment closer to the antenna(s) on the tower mast. While helpful in mitigating some insertion losses associated with cables running up the towers to the antenna(s), such placement of the amplifiers still fails to address insertion losses associated with the jumper cable that connects the amplifier to the antenna, as well as any power divider disposed therebetween. Moreover, even where an antenna has multiple elements, those elements are typically coupled to and serviced by a common amplifier and divider. Thus, failure of a single amplifier, divider or other amplifying component may effectively render the entire system inoperable. In this manner, the reliability of a system having multiple elements remains undermined by the collective dependence of the respective elements on common components. Furthermore, the relative inaccessibility of the amplification equipment attributable to its proximity to the to the tower mast can compound repairs and other maintenance. Consequently, inefficiencies associated with insertion losses continue to hinder operation and result in a relatively high cost of unit per watt.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the present invention.

DETAILED DESCRIPTION OF THE PREFERRED EMBODIMENT

The invention addresses the above-discussed problems associated with the prior art by providing an antenna system 10 configured to improve cellular system performance by, in one respect, mitigating the occurrence of insertion losses through the use of an antenna incorporating an array of antenna elements and distributed amplifiers coupled to those individual elements in the array.

Figure 1:
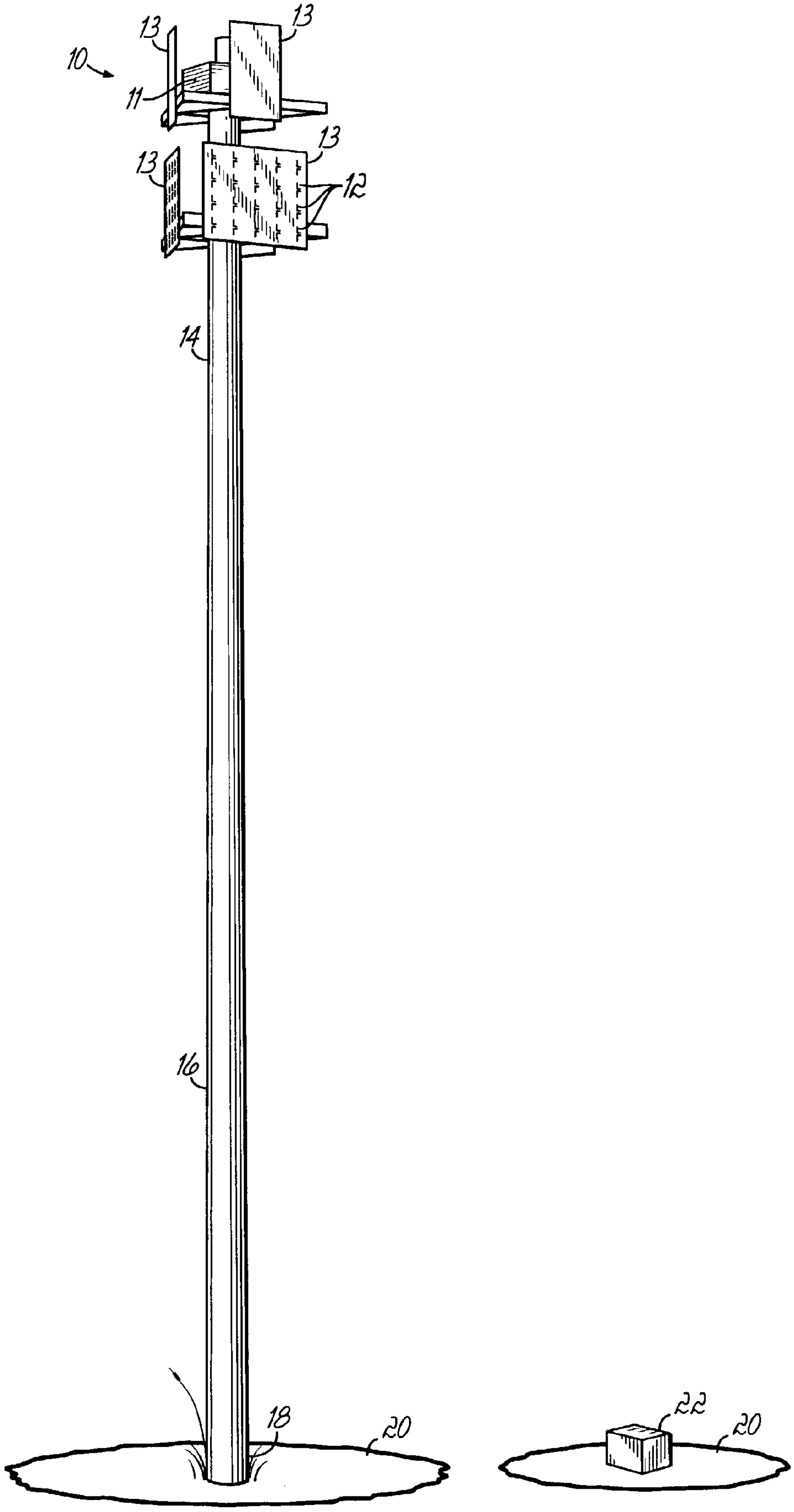
FIG. 1 shows an antenna system in accordance with the principles of the present invention.

Referring generally to FIG. 1, there is shown an exemplary antenna system 10 in accordance with the precepts of the present invention. In order to achieve lower incidence of insertion loss, the antenna system 10 uses amplification equipment 11 disposed at the antenna element level. As such, exemplary antenna system 10 typically includes a plurality of beam width antenna arrays 13 suspended by a tower 16 or other support structure. Each antenna array 13 may include a plurality of antenna elements 12. The antenna arrays 13 may attach proximate the top 14 of the tower 16. Tower 16 may be supported by a base 18, a portion of which is typically buried in the ground 20. Exemplary amplification equipment 11 may include at least one amplifier or comparable device suited to discriminate between desired signals and spurious radiation and/or a device configured to increase the strength of an electronic impulse.

Antenna system 10 may further include a control or base station 22 in electrical communication with the antenna elements 12. Of note, embodiments of the present invention may allow the antenna elements 12 to communicate with the control station 22 via small diameter (i.e. not low-loss) cable. Utilization of the small diameter cable can reduce system 10 costs and wind load complications. Of note, while control station 22 may stand adjacent tower 16, the exemplary antenna system 10 depicted in FIG. 1 includes a remotely situated control station 22. A telecommunications system consistent with the principles of the present invention may further collocate control station 22 with a central office (not shown) for reasons of convenience. While such a configuration as shown in the exemplary system 10 of FIG. 1 has particular application in the context of embodiments of the present invention, one skilled in the art should appreciate that the number, presence, and arrangement of the exemplary components 11–22 of the antenna system 10 may be altered substantially and still remain with the confines of the present invention.

In the illustrated embodiment of FIG. 1, amplification equipment 11, which may include one or more low noise amplifiers, is placed at or near the tower top 14 to combat insertion losses. Namely, positioning of the amplification equipment 11 near the tower top 14 may obviate the requirement that a cable connecting the antenna elements 12 to a low noise amplifier run the entire length of the tower 16. Furthermore, an embodiment of the present invention may place respective low noise amplifiers at each antenna element 12. The distributed arrangement of the amplification equipment 11 may further eliminate much of the insertion losses conventionally associated with the above-discussed jumper cables.

Still other embodiments of the antenna system 10 shown in FIG. 1 may mitigate insertion losses associated with conventional power dividers as discussed below in the text describing FIGS. 2–7. Moreover, because the active elements are distributed at the antenna element level, the system 10 can withstand one or more low noise amplifier failures with minimal impact to noise figure performance. Noise figure performance generally regards the signal-to-noise ratio and relates directly to signal clarity and other desirable operating characteristics.

Figure 2:
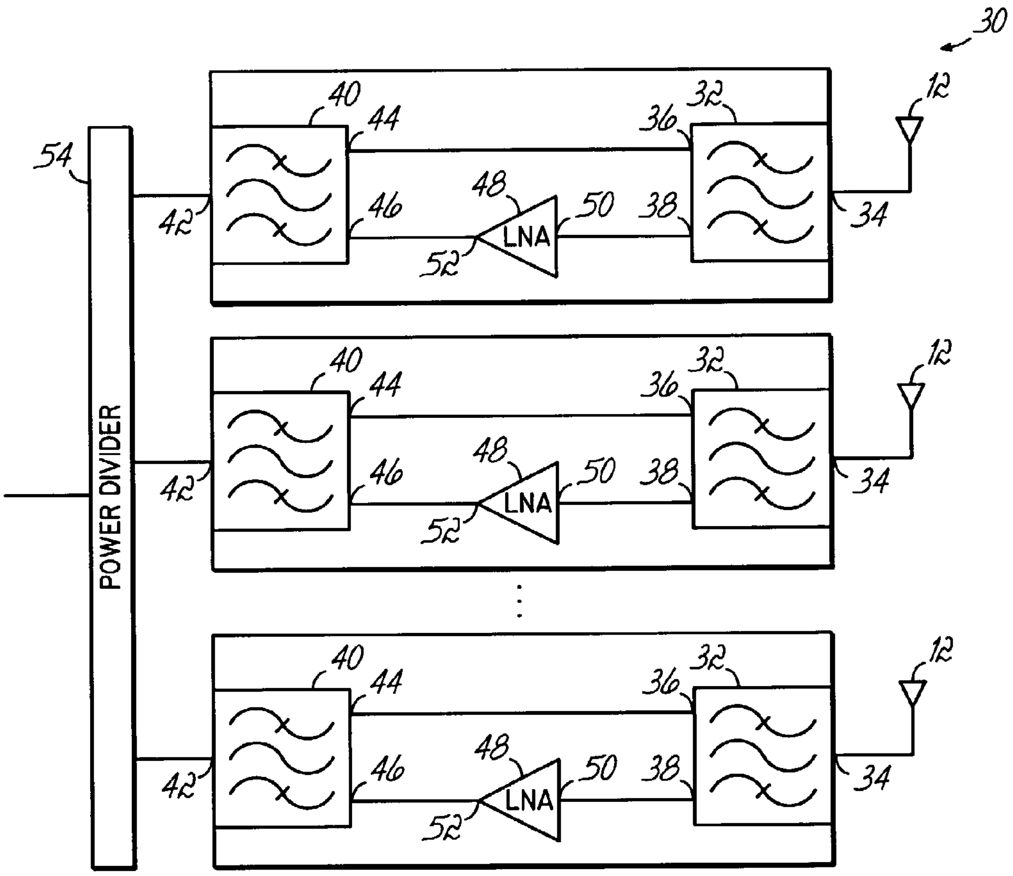
FIG. 2 is a block diagram of an antenna assembly including two sets of duplexers, and having application within the system of FIG. 1.

To this end, FIG. 2 shows an amplification system 30 and associated array of antenna elements 12 suited for application within the antenna system environment of FIG. 1. As above, suitable antenna elements 12 may include virtually any device configured to transmit and/or emit electromagnetic radiation. As such, the antenna elements 12 may typically service cellular, paging and other applications. Notably, the amplification system 30 of FIG. 2 incorporates both first and second sets of duplexers 32, 40, respectively. The duplexer sets 32, 34 cooperate with other amplification components 48, 54 to realize performance gains that reduce incidences of noise, as well as insertion loss conventionally associated with a power divider 54.

Of note, a suitable duplexer 32, 40 for purposes of the present embodiment may include any device configured to facilitate two-way signal transmission. In one embodiment, the duplexers 32, 40 and at least one low noise amplifier 48 may be collocated proximate the top 14 of a tower structure 16 supporting the plurality of antenna elements 12. Such concentrated placement may function to further reduce insertion losses associated with conventional, lengthy cables. The distributed arrangement of the duplexers 32, 40, antenna elements 12 and low noise amplifiers 48 may additionally contribute to the robustness of the system 30 by virtue of the each antenna element 12 not being collectively dependent upon a single amplification component 11.

As employed in FIG. 2, the low noise amplifiers 48 or other comparable filtering/amplification device may function to both discriminate between and bolster the strength of processed signals. As shown in FIG. 2, the low noise amplifiers 48 typically operate between respective antenna elements 12 and at least one power divider 54. As such, the low noise amplifiers 48 may select and output to the power divider 54 a desired signal or group of signals determined from among those received from respective antenna elements 12. For purposes of this disclosure, a suitable power divider 54 may comprise any device configured to apportion and/or combine electrical signals. Thus, the power divider 54, in one respect, may combine respective outputs from the plurality of low noise amplifiers 48 corresponding to the received signals.

The amplification system 30 of FIG. 2 includes a first set of duplexers 32 proximate the plurality of antenna elements 12. Each duplexer 32 of the first set may have at least one receive port 36, one antenna port 34 and one transmit port 38. These respective ports 34, 36 and 38 of the duplexers 32 may accommodate two-way signal transmission desirable for operation of the antenna elements 12. To this end, the antenna ports 34 of the first set of each duplexer 32 may couple to respective antenna elements 12 of the plurality of antenna elements. As such, the first set of duplexers 32 are positioned to receive and communicate signals to the low noise amplifiers 48 from the antenna elements 12. Moreover, the duplexers 32 may be configured to simultaneously convey signals arriving at their receive ports 36 to the antenna elements 12 for subsequent downlink transmission.

Each duplexer 40 of the second set of duplexers may likewise have at least one receive port 46, one transmit port 44 and one antenna port 42. As in the embodiment shown in FIG. 2, the respective receive ports 36 of the first set of duplexers 32 may couple to the respective transmit ports 44 of the second set of duplexers 40. That is, signals output from a duplexer 40 of the second set may feed an antenna element 12 via a corresponding duplexer 32 of the first set.

The amplification system 30 of FIG. 2 may further include a plurality of low noise amplifiers 48. For purposes of this disclosure, a suitable low noise amplifier 48 in accordance with the principles of the present invention may include any device useful in discriminating between desired signals and spurious radiation and/or suited to bolster a received signal. In accordance with one embodiment of the present invention, each low noise amplifier 48 may have at least one input 50 and output 52. The input 50 of each low noise amplifier 48 may couple to a respective transmit port 38 of the first set of duplexers 32.

The output 52 of each low noise amplifier 48 may, in turn, couple to a respective receive port 46 of the second set of the plurality of duplexers 40. As such, signals from the duplexers 32 of the first set of duplexers may drive the output of each low noise amplifier 48 as supplied to respective duplexers 40 of the second set. In one embodiment, at least one power divider 54 may couple to respective antenna ports 42 of the second set of the plurality of duplexers 40. Thus, the power divider 54 may be configured to simultaneously accommodate signals intended for transmission at the antenna elements 12, as well as those transmitted to the duplexers 40. Accordingly, the power divider 54 may simultaneously combine signals received from the antenna elements 12 via the low noise amplifiers 48 and duplexers 40. Of note, another embodiment consistent with the underlying principles of the invention may include multiple power dividers 34 as dictated by space, performance and other system 30 preferences.

In this manner, the embodiment shown in FIG. 2 reduces incidences of insertion loss associated with transmission and jumper cables of conventional systems. The configuration of the amplification system 30 similarly minimizes insertion losses attributable to power dividers in known antenna systems. Cumulative improvements realized by the amplification system 30 of FIG. 1 may further realize signal improvements regarding the signal to noise ratio on the order of 1.5 decibels (dB). Additionally, embodiments of the present invention may improve system reliability relative to conventional applications by virtue of the low noise amplifiers 48 and duplexers 32 being distributed among multiple antenna elements 12. Thus, the amplification system 30 can withstand one or more low noise amplifier 48 failures with minimal impact to signal quality.

Figure 3:
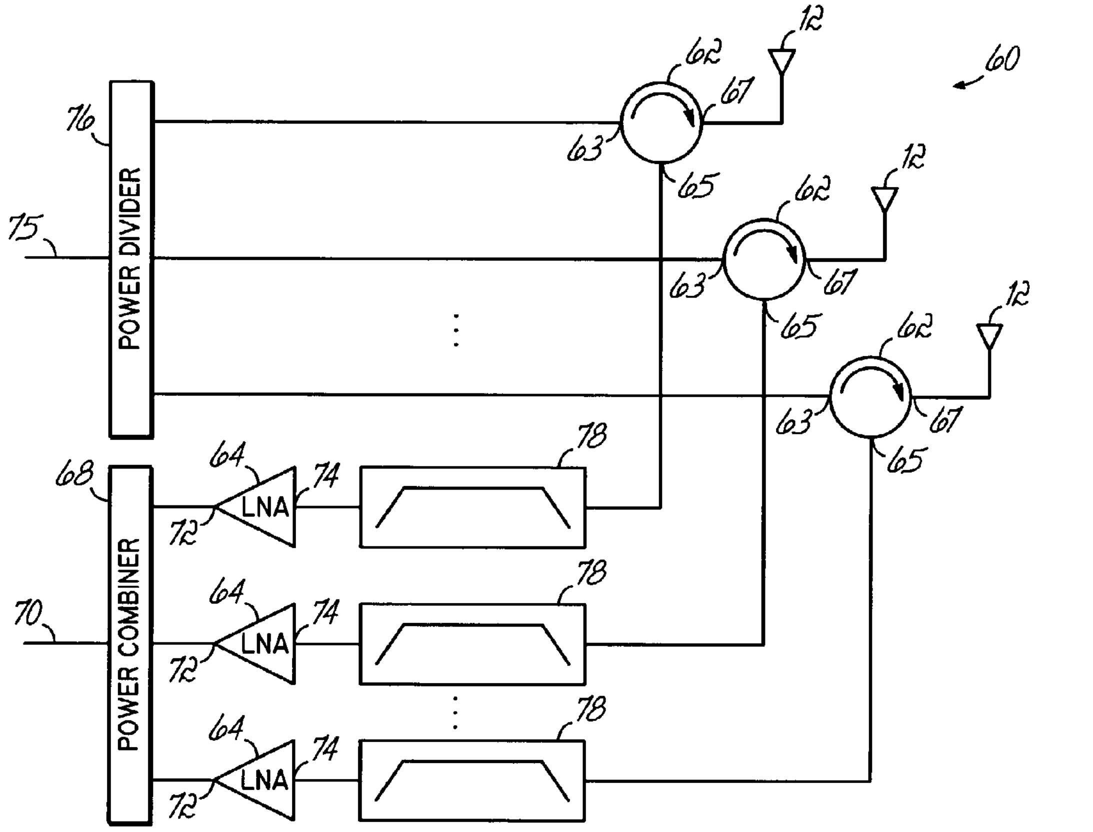
FIG. 3 is a block diagram of an antenna assembly including circulators, and having application within the antenna system of FIG. 1 in accordance with another aspect of the invention.

Similar advantages may be realized using the antenna configuration shown in FIG. 3. As with the embodiment of FIG. 2, the amplification system 30 may have application within the tower structure and antenna environment of FIG. 1. The exemplary amplification system 60 of FIG. 3 notably achieves duplexing at the antenna element level. To this end, the amplification system 60 may rely on a plurality of circulators 62, duplexers, or other device(s) suited to realize common voltages across incoming signal lines and/or otherwise enable two-way signal transmission. Of note, the antenna system 60 features separate transmit and receive cables 70, 75, respectively. Inclusion and separation of the separate cables 70, 75 may accommodate desirable cable sizes having distinct and advantageous characteristics. That is, the presence of a plurality of low noise amplifiers 64 may enable the receive cable 70 to be of a high-loss/low power rating having a cross-sectional small diameter. Use of such cabling may save manufacturing and maintenance costs, while reducing damaging effects resulting from wind load.

Turning more particularly to FIG. 3, the amplification system 60 includes antenna elements 12 typically configured to receive and transmit electromagnetic radiation. As such, the amplification system 60 of FIG. 3 may have application as or in conjunction with the amplification equipment 11 comprising part of the antenna system 10 of FIG. 1. The amplification system 60 of FIG. 3 may further include a plurality of circulators 62 or other duplexers, each having respective antenna ports 67 coupled to respective antenna elements 12. As discussed herein and for purposes of this disclosure, the functionality of the circulators 62 may be supplanted by any device configured to match impedance and/or otherwise enable two-way passage of signals two and from the antenna elements 12. Moreover, each circulator 62 may include respective receive ports 63 and transmit ports 65. The low noise amplifiers 64 may each have an output 72 and an input 74. The input of each low noise amplifier 64 may couple to the transmit port 65 of a respective circulator 62 of the plurality of circulators.

One embodiment consistent with the principles of the present invention may include at least one combiner 68 within the amplification system 60 of FIG. 3. As such, each the at least one combiner 68 may couple to and sum the respective outputs 72 of the low noise amplifiers 64. Another or the same embodiment may include at least one power divider 76 coupled to the respective receive ports 63 of each circulator 62. A power divider 76 consistent with the principles of the present invention may apportion a transmission signal originating from a base station 22 and intended for the antenna elements 12.

Of note, the antenna system 60 may further include one or more band pass filters 78 coupled to both the respective input 74 of each low noise amplifier 64 and to the transmit port 65 of each circulator 62. Thus, the signals outputted from the antenna elements 12 and passing through the circulators 63 are filtered prior to processing at the low noise amplifiers 64. One skilled in the art should appreciate that while separate circulators 62 are shown coupled to each antenna element 12 in FIG. 3, another embodiment consistent with the underlying principles of the present invention may rely on more or fewer duplexer equivalents, to include one circulator 62 or duplexer coupled to more than one antenna elements 12 of the plurality of antenna elements.

Figure 4:
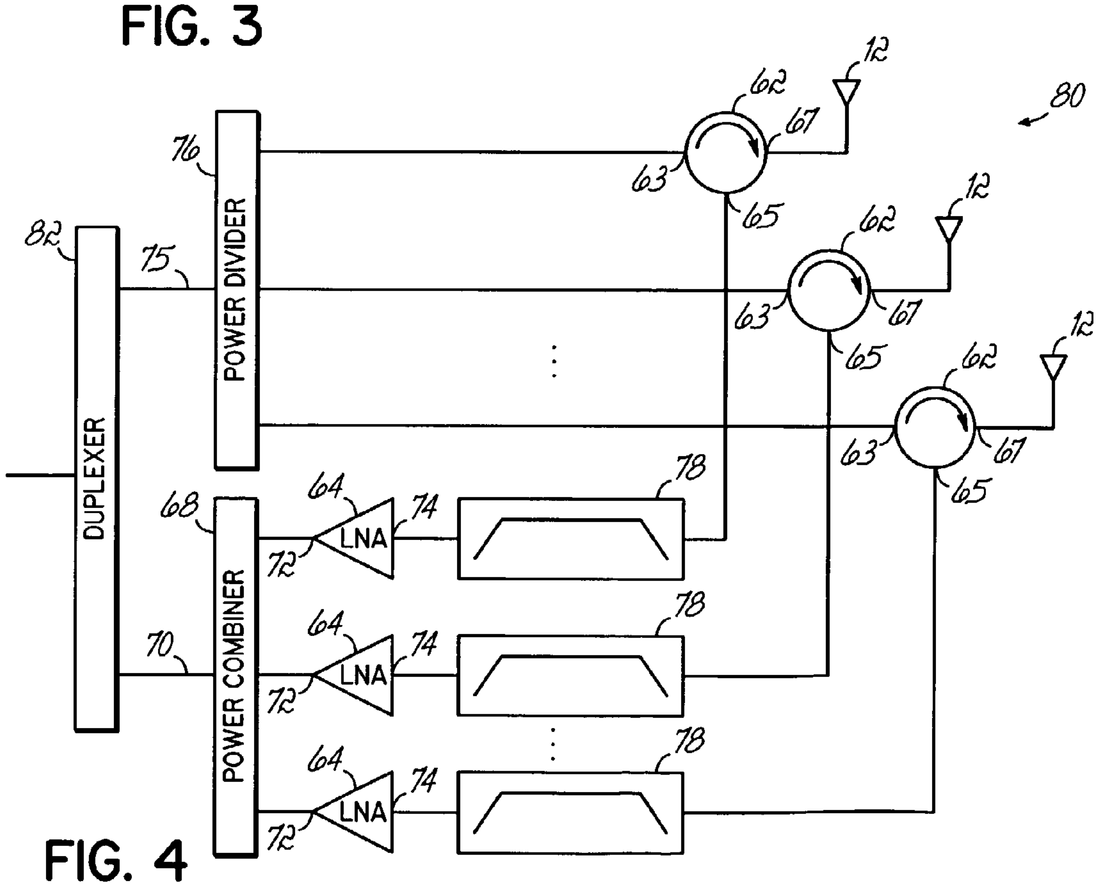
FIG. 4 is a block diagram of the antenna assembly of FIG. 3, and including an additional duplexer in accordance with another aspect of the invention.

An embodiment of the amplification system 80 shown in FIG. 4 couples a duplexer 82 to the combiner 68 and power divider 76 included in the amplification system 60 of FIG. 3. In this manner, the duplexer 82 of FIG. 4 facilitates two-way communication of signals two and from the base station 22. Of note, the antenna system 80 of FIG. 4 may function where preferred in the absence of the power divider 76 in accordance with the underlying principles of the present invention. As such, the single duplexer 82 may couple to at least one combiner 68 and to the receive port 63 of at least one duplexer 62 of the plurality of duplexers. The configuration of the antenna system 80 of FIG. 4 may in this manner achieve significant signal performance gains with minimal filtering. The absence of such filtering requirements and associated equipment can translate into reduced production, maintenance and operating costs.

The transmission paths shown in the embodiments of FIGS. 2–4 may be implemented in a number of manners consistent with the invention. For example, amplification of the transmission paths may be performed by a single amplifier positioned at the base station or at the tower top. Alternatively, as exemplified by the system 90 of FIG. 5, a plurality of power amplifiers 102, positioned in a distributive arrangement with respect to the antenna elements 12, may be used to provide amplification for the transmission paths for the various antenna elements 12.

Figure 5:
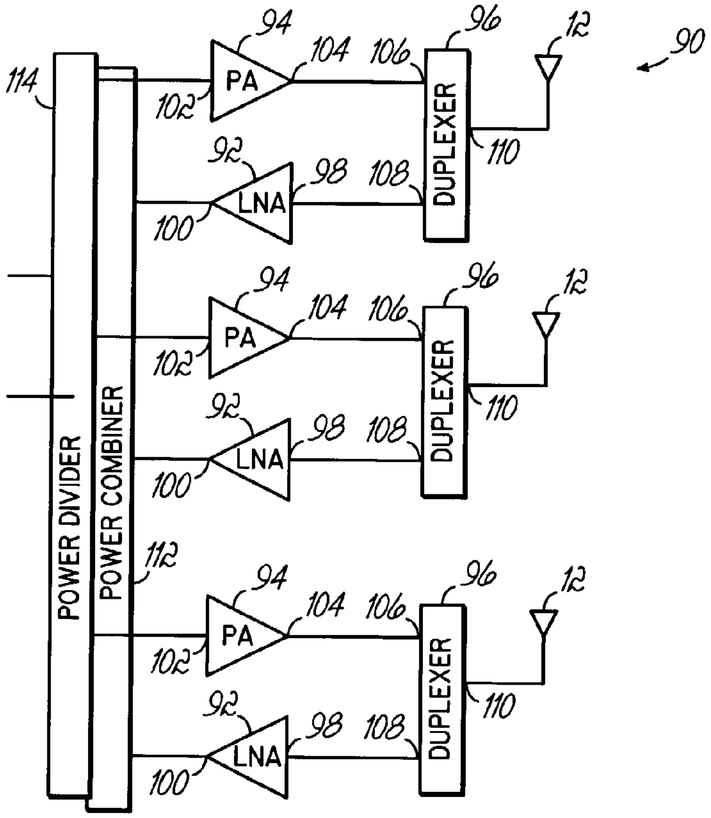
FIG. 5 is a block diagram of an antenna assembly including distributed power amplifiers, and having additional application within the antenna system of FIG. 1 in accordance with another aspect of the invention.

As with the embodiment shown in FIG. 2, the amplification system 90 shown in FIG. 5 realizes greater system efficiently, power savings and improved signal quality by virtue of placing a plurality of low noise and power amplifiers 92, 94, respectively, as well as duplexers 96 proximate the antenna elements 12. As shown in FIG. 5, amplification system 90 includes a plurality of antenna elements 12, which may or may not resemble antenna elements discussed in the above-illustrated embodiments. Thus, the amplification system 90 illustrated in FIG. 5 may also have application within the antenna system 10 of FIG. 1.

An embodiment of amplification system 90 includes a plurality of low noise amplifiers 92. As above, while the low noise amplifiers 92 shown in FIG. 5 may have particular application in the context of certain operating scenarios, other devices suited to discriminate between signals and/or increase signal strength may be substituted in their place in accordance with the principles of the present invention. Each low noise amplifier 92 may have an input 98 and an output 100. The antenna system 90 may additionally include a plurality of power amplifiers 94. Each power amplifier may be configured to boost signal strength, and have an associated input 102 and an output 104.

As shown in FIG. 5, the system 90 may include a plurality of duplexers 96 coupled to respective antenna elements 12. More particularly, an antenna port 110 of each duplexer 96 may couple to the antenna elements 12, which are configured to receive and transmit electromagnetic radiation. As such, the duplexer 96 enables the antenna element 12 to simultaneously receive and transmit signals. Accordingly, a transmit port 108 of each duplexer 96 may couple to respective inputs 98 of each low noise amplifier 92. Thus, the duplexer 96 is configured to pass signals from the antenna elements to the low noise amplifiers 92 on their way to the base station 22. Outputs 104 of the power amplifiers 94 of one embodiment couple to respective input ports 106 of each duplexer 96. In this manner, the duplexer 96 passes the bolstered signals outputted from the power amplifiers 94 to respective antenna elements 12 for subsequent transmission.

The exemplary antenna system 90 of FIG. 5 may also rely on at least one combiner 112 to sum the respective outputs 100 of each low noise amplifier 92. Thus, the signals filtered and conveyed from the antenna elements 12 via the low noise amplifiers 92 are combined prior to reception at the base station 22. One or more power dividers 114 may additionally couple to the respective inputs 102 of each power amplifier 94. In this manner, signals from the base station 22 are apportioned prior to amplification and subsequent transmission at antenna elements 12. Of note, active elements 92, 94, 96 are typically positioned at the antenna element level to realize the above-discussed advantages.

Figure 6:
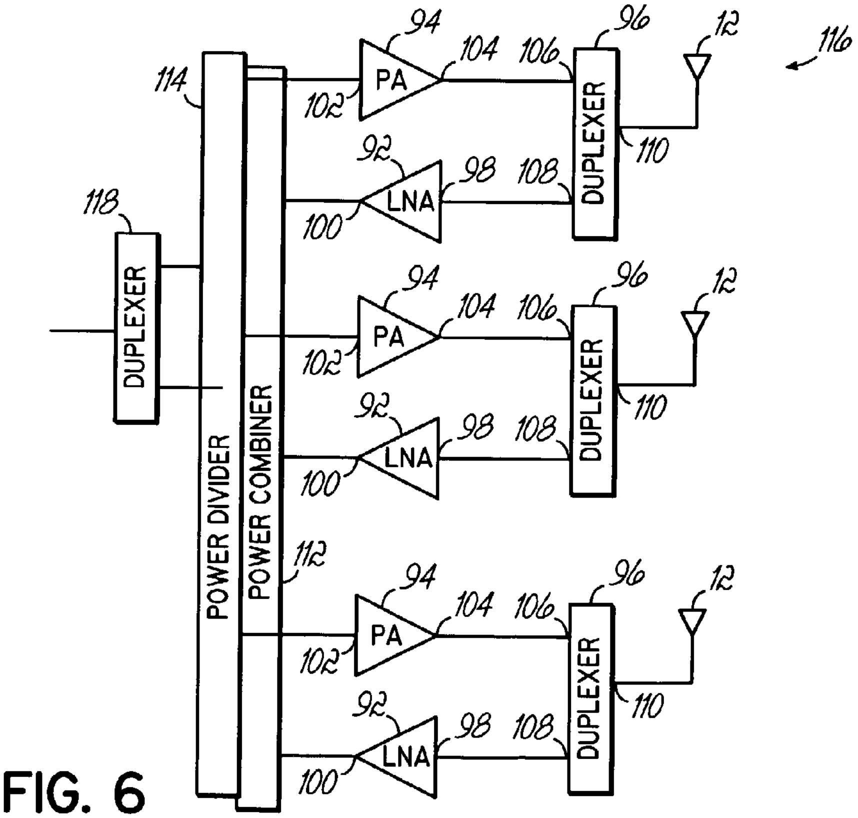
FIG. 6 is a block diagram of the antenna assembly of FIG. 5, and including an additional duplexer in accordance with another aspect of the invention.

The amplification system 116 of FIG. 6 is similar to the amplification system of FIG. 5 in most respects, except for the inclusion of a common duplexer 118. The duplexer 118 couples to both the combiner 112 and the power divider 114. One embodiment of the amplification system 116 may include the duplexer 118 for the purpose of enabling separate receive and transmit signals to pass over a single cable coupled to both the duplexer 118 the base station 22.

Figure 7:
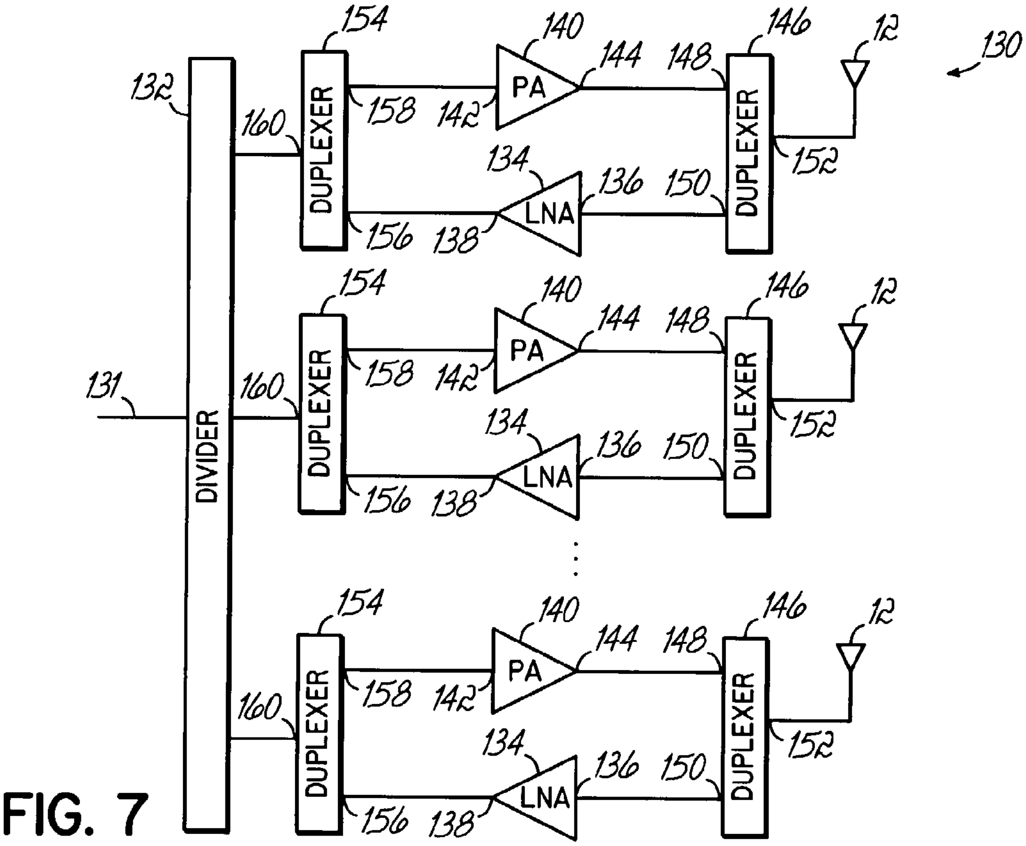
FIG. 7 is a block diagram of an antenna assembly including distributed power amplifiers and two sets of duplexers, and having application within the antenna system of FIG. 1 in accordance with another aspect of the invention.

The amplification system 130 shown in FIG. 7 may achieve many of the above-discussed advantages while utilizing a single power divider 132. An embodiment of the amplification system 130 thus necessitates only a single transmission cable 131. The antenna system 130 may additionally include a plurality of antenna elements 12. As with all of the above-discussed embodiments, suitable antenna elements 12 may be configured to both receive and transmit electromagnetic radiation and may include other functionality as dictated by operating criteria. Similarly, a power divider 132 consistent with the principles of the present invention may include any device configured to either or both apportion or sum received signals.

The amplification system 130 may further include a plurality of low noise amplifiers 134 in communication with both the antenna elements 12 and the power divider 132. More particularly, each low noise amplifier may be configured to discriminate between different signals being transmitted, or uplinked, to a base station 22. As such, each low noise amplifier 134 may have an input 136 and an output 138 with which to respectively receive and transmit processed signals. As shown in FIG. 7, a plurality of power amplifiers 140 may also be included in the exemplary antenna system 130. Accordingly, each power amplifier 140 may have an input 142 and an output 144.

The embodiment shown in FIG. 7 may also include two sets of duplexers 146, 154. The first set of duplexers 146 may couple to at least the antenna elements 12. To this end, each duplexer 146 of the first set may have at least one antenna port 152. Accordingly, each antenna port 152 may couple to a respective antenna element 12 of the plurality of antenna elements. Each duplexer 146 may also include at least one receive port 148 and one transmit port 150. Transmit ports 150 of each duplexer 146 of the first set may, in turn, couple to respective inputs 136 of each low noise amplifier 134. Thus, the duplexer 146 brokers signals from the antenna elements 12 to the low noise amplifiers 134. The low noise amplifiers 134 may subsequently determine and output the most desirable antenna signal(s) from those received from the duplexer 146. Receive ports 148 of each of the first set of the plurality of duplexers 146 may couple to the output 144 of the respective power amplifier 140 of the plurality of power amplifiers. As such, the duplexers 146 may pass amplified signals received from the power amplifiers 140 to the antenna elements 12 for downlink transmission.

Each duplexer 154 of the second set of the plurality of duplexers may likewise include at least one receive port 156, transmit port 158 and antenna port 160. The receive port 156 of each of the second set of duplexers 154 may couple to the output 138 of a respective low noise amplifier 134. Moreover, transmit ports 158 of each of the second set of the plurality of duplexers 154 may couple to the inputs 142 of respective power amplifiers 140. Finally, the respective antenna ports 160 of each of the second set of duplexers 154 may couple to at least the power divider 132.

In this manner, the duplexers 154 allow signals to pass from the power divider 132 to the antenna elements 12, while simultaneously outputting signals received from the low noise amplifiers 134 back to the power divider 132. Of note, while reliance on a single power divider 132 may have particular application under certain circumstances, one skilled in the art should nonetheless appreciate that the functionality of the single power divider 132 shown in FIG. 7 may be supplanted with a plurality of power dividers or other devices suited to apportion power and/or current.

What has been shown and described herein is a novel antenna system employing duplexers, power combiners/dividers, low power/noise amplifiers and/or other modules at or near the feeds of individual array antenna elements 12 in a manner that addresses shortcomings of the prior art. Benefits from such embodiments include minimization of filtering, cable and other equipment used in comparable systems. Embodiments of the present invention further mitigate the occurrence and effects of insertion loss attributable to power dividers and cabling in known antenna systems. Cumulative improvements realized by the disclosed embodiments may additionally realize signal improvements in system signal-to-noise ratio. System reliability is also improved by virtue of the low noise amplifiers 48 and duplexers 32 being distributed among multiple antenna elements 12. Thus, the amplification system 30 can withstand one or more low noise amplifier 48 failures with minimal impact to signal quality.

While the present invention has been illustrated by a description of various embodiments, and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. An antenna system comprising:

(a) a plurality of antenna elements, the antenna elements configured to receive and transmit electromagnetic radiation;

(b) a first set of duplexers, each duplexer of the first set having a receive port, a transmit port and an antenna port, wherein the antenna ports of the first set of duplexers are coupled to respective antenna elements from the plurality of antenna elements;

(c) a second set of duplexers, each duplexer of the second set having a receive port, a transmit port and an antenna port, wherein the receive ports of the first set of duplexers are coupled to respective transmit ports of the second set of duplexers;

(d) a plurality of low noise amplifiers, each low noise amplifier having an input coupled to a transmit port of a duplexer the first set of duplexers and an output coupled to a receive port of a duplexer from the second set of duplexers; and (e) a power divider, the power divider coupled to the antenna ports of the second set of duplexers.

2. The antenna system of claim 1, wherein the antenna ports of the second set of duplexers are coupled to separate power dividers.

3. An antenna system comprising:

(a) a plurality of antenna elements, the antenna elements configured to receive and transmit electromagnetic radiation;

(b) a plurality of duplexers, each duplexer having a receive port, a transmit port and an antenna port, wherein the antenna ports of the plurality of duplexers are coupled to respective antenna elements of the plurality of antenna elements;

(c) a plurality of low noise amplifiers, each low noise amplifier having an input and an output, wherein each input couples to the transmit port of a respective duplexer of the plurality of duplexers;

(d) a combiner, the combiner configured to sum the outputs of the low noise amplifiers; and (e) a receive/transmit duplexer coupled to both the combiner and to the receive port of at least one duplexer of the plurality of duplexers.

4. The antenna system of claim 3, wherein at least one duplexer of the plurality of duplexers comprises a circulator.

5. The antenna system of claim 3, further including a plurality of filters, each filter of the plurality of filters coupled to the respective input of each low noise amplifier and to the respective transmit port of each duplexer of the plurality of duplexers.

6. The antenna system of claim 3, wherein each antenna element of the plurality of antenna elements couples to a separate duplexer of the plurality of duplexers.

7. The antenna system of claim 3, further comprising at least one power divider, the at least one power divider coupled to the respective receive ports of each duplexer of the plurality of duplexers.

8. The antenna system of claim 7, wherein a receive/transmit duplexer is coupled to both the combiner and the power divider.

9. An antenna system comprising:

(a) a plurality of antenna elements, the antenna elements configured to receive and transmit electromagnetic radiation;

(b) a plurality of low noise amplifiers, each low noise amplifier having an input and an output;

(c) a plurality of power amplifiers, each power amplifier having an input and an output;

(d) a plurality of duplexers, each duplexer of the plurality having at least one receive port, transmit port and antenna port, wherein the antenna ports of the duplexers couple to respective antenna elements of the plurality of antenna elements, wherein the transmit ports of the duplexers couple to the inputs of respective low noise amplifiers of the plurality of low noise amplifiers and the receive ports of the duplexers couple to the outputs of respective linear power amplifiers of the plurality of linear power amplifiers; and (e) a second set of duplexers, each duplexer of the second set also having at least one receive port, transmit port and antenna port, wherein the receive port of each duplexer of the second set of duplexers couples to the output of a respective low noise amplifier, and wherein the transmit port of each duplexer of the second set of duplexers couples to the input of the respective power amplifier.

10. The antenna system of claim 9, further comprising a power divider coupled to the second set of duplexers.

11. The antenna system of claim 9, further comprising a power divider coupled to each duplexer of the second set of duplexers.

12. A method of receiving and transmitting electromagnetic radiation from and to a plurality of antenna elements, comprising:

(a) in each duplexer of a first set of duplexers, receiving a receive signal representative of electromagnetic radiation received from a respective antenna element of a plurality of antenna elements;

(b) amplifying each receive signal with a respective low noise amplifier of a plurality of low noise amplifiers;

(c) communicating each amplified receive signal from the respective low noise amplifier of the plurality of low noise amplifiers to a common power divider using a respective duplexer of a second set of duplexers;

(d) receiving a transmit signal representative of electromagnetic radiation transmitted from the common power divider in each duplexer of the second set of duplexers; and (e) communicating the transmit signal from each duplexer of the second set of duplexers to a respective antenna element of the plurality of antenna elements using a respective duplexer of the first set of duplexers.

13. A method of receiving and transmitting electromagnetic radiation from and to a plurality of antenna elements, comprising:

(a) in each duplexer of a plurality of duplexers, receiving a receive signal representative of electromagnetic radiation received from a respective antenna element of a plurality of antenna elements;

(b) amplifying each receive signal with a respective low noise amplifier of a plurality of low noise amplifiers;

(c) communicating each amplified receive signal from the respective low noise amplifier of the plurality of low noise amplifiers to a common power combiner;

(d) receiving at each duplexer of the plurality of duplexers a transmit signal representative of electromagnetic radiation transmitted from a base station;

(e) communicating the transmit signal from each duplexer of the plurality of duplexers to a respective antenna element of the plurality of antenna elements; and (f) receiving a combined signal from the common power combiner at receive/transmit duplexer.

14. The method of claim 13, wherein receiving the receive signal further comprises receiving the receive signal in a circulator and communicating the receive signal to the respective low noise amplifier.

15. The method of claim 13, further comprising filtering the receive signal.

16. The method of claim 13, wherein communicating the transmit signal to each antenna element of the plurality of antenna elements further comprises communicating the transmit signal from a power divider coupled to the respective duplexers of the plurality of duplexers.

17. The method of claim 16, wherein communicating the transmit signal from the power divider further comprises transmitting an uplink signal from a transmit/receive duplexer to the power divider.

18. A method of receiving and transmitting electromagnetic radiation from and to a plurality of antenna elements, comprising:

(a) receiving a receive signal representative of electromagnetic radiation received from a respective antenna element of a plurality of antenna elements in each duplexer of a plurality of duplexers;

(b) amplifying each receive signal with a respective low noise amplifier of a plurality of low noise amplifiers;

(c) amplifying at each power amplifier of a plurality of power amplifiers a transmit signal representative of electromagnetic radiation transmitted from a base station;

(d) communicating the transmit signal to each antenna element of the plurality of antenna elements using respective duplexers of the plurality of duplexers; and (e) summing each amplified receive signal from the respective low noise amplifiers at a common power combiner; and (f) receiving the summed signal from the common power combiner in a receive/transmit duplexer.

19. The method according to claim 18, wherein amplifying the transmit signal further comprises receiving an uplink signal from a power divider at each power amplifier of the plurality of power amplifiers.

20. The method of claim 19, further comprising communicating the uplink signal to the power divider from a transmit/receive duplexer.

21. The method of claim 12, wherein amplifying the receive signal with the respective low noise amplifier comprises communicating the amplified receive signal to a respective duplexer of a second set of duplexers.

22. The method of claim 12, further comprising communicating the amplified receive signal to a power divider via the respective duplexer of the second set of duplexers.

23. The method of claim 12, further comprising amplifying each transmit signal with a respective power amplifier and communicating the transmit signal to each power amplifier of the plurality of power amplifiers from a respective duplexer of a second set of duplexers.

24. The method of claim 23, further comprising communicating an uplink signal from a power divider to the respective duplexer of the second set of duplexers.

25. An antenna system comprising:

(a) a plurality of antenna elements, the antenna elements configured to receive and transmit electromagnetic radiation;

(b) a plurality of low noise amplifiers, each low noise amplifier having an input and an output;

(c) a plurality of power amplifiers, each power amplifier having an input and an output;

(d) a plurality of duplexers, each duplexer of the plurality having at least one receive port, transmit port and antenna port, wherein the antenna ports of the duplexers couple to respective antenna elements of the plurality of antenna elements, wherein the transmit ports of the duplexers couple to the inputs of respective low noise amplifiers of the plurality of low noise amplifiers and the receive ports of the duplexers couple to the outputs of respective power amplifiers of the plurality of power amplifiers;

(e) at least one of a power divider and a power combiner in electrical communication with the plurality of antenna elements; and (f) a second duplexer coupled to the at least one of the power divider and the power combiner.

* * * * *

UNITED STATES PATENT AND TRADEMARK OFFICE

CERTIFICATE OF CORRECTION

PATENT NO. : 6,983,174 B2
APPLICATION NO. : 10/246178
DATED : January 3, 2006

INVENTOR(S) : Russell Hoppenstein, Mike Thomas and Mano D. Judd

It is certified that error appears in the above-identified patent and that said Letters Patent is hereby corrected as shown below:

Page 1, Column 2, OTHER PUBLICATIONS, reads "Howat, F., "Cell Like Performace Using the Remotely…" and should read -- Howat, F., "Cell Like Performance Using the Remotely… --.

Column 1, lines 46-47, read "…system. (new paragraph) The size and number of coaxial cable further require…" and should read -- …system. The size and number of coxial cable further require… --

Column 2, line 6, reads "…with the equipment, itself." and should read -- …with the equipment itself. --.

Column 2, line 24, reads "…to the to the tower mast can compound repairs and other…" and should read -- …to the tower mast can compound repairs and other… --.

Column 3, line 38, reads "...altered substantially and still remain with the confines of the…" and should read -- ...altered substantially and still remain within the confines of the… --.

Column 4, line 20 reads "…virtue of the each antenna element 12 not being collectively…" and should read -- …virtue of each antenna element 12 not being collectively … --.

Column 6, line 61 reads "…efficiently, power savings and improved signal quality by…" and should read -- … efficiency, power savings and improved signal quality by … --.

Column 7, line 51 reads "…coupled to both the duplexer 118 the base station 22." and should read -- … coupled to both the duplexer 118 and the base station 22. --.

Column 9, line 14 reads "…of applicant's general inventive concept." and should read -- …of applicants' general inventive concept. --.

Column 9, CLAIM 1, line 32 reads, "…a duplexer the first set of duplexers and an output…" and should read -- …a duplexer of the first set of duplexers and an output… --.

UNITED STATES PATENT AND TRADEMARK OFFICE

CERTIFICATE OF CORRECTION

PATENT NO. : 6,983,174 B2 
APPLICATION NO. : 10/246178
DATED : January 3, 2006
INVENTOR(S) : Russell Hoppenstein, Mike Thomas, and Mano D. Judd It is certified that error appears in the above-identified patent and that said Letters Patent is hereby corrected as shown below:

Column 12, CLAIM 21, line 9 reads, "...receive signal with the respective low noise amplifier comprises..." and should read -- ...receive signal with the respective low noise amplifier further comprises...--.

Column 12, CLAIM 25, line 40 reads, "...outputs of respective power amplifiers of the plurality..." and should read -- ...outputs of respective linear power amplifiers of the plurality...--.

Signed and Sealed this

Nineteenth Day of December, 2006

JON W. DUDAS
*Director of the United States Patent and Trademark Office*